United States Patent [19]

Furuno

[11] Patent Number: 4,622,133
[45] Date of Patent: Nov. 11, 1986

[54] WATER-DEIONIZING SYSTEM

[75] Inventor: Nobuo Furuno, Amagasaki, Japan

[73] Assignee: Nippon Paint Co., Ltd., Osaka, Japan

[21] Appl. No.: 826,460

[22] Filed: Feb. 5, 1986

[30] Foreign Application Priority Data

Feb. 6, 1985 [JP] Japan .................................. 60-022285

[51] Int. Cl.$^4$ ............................................. C02F 9/00
[52] U.S. Cl. .................................. 210/96.2; 210/662;
210/96.1; 210/195.2; 210/284; 210/900
[58] Field of Search ............... 210/638, 662, 663, 669,
210/685, 686, 694, 96.1, 96.2, 143, 167, 266,
284, 900, 195.1, 195.2

[56] References Cited

U.S. PATENT DOCUMENTS

| | | | |
|---|---|---|---|
| 3,276,458 | 10/1966 | Iversen et al. | 210/900 |
| 3,870,033 | 3/1975 | Faylor et al. | 210/900 |
| 3,985,648 | 10/1976 | Casolo | 210/686 |
| 4,246,101 | 1/1981 | Selby | 210/669 |
| 4,341,636 | 7/1982 | Harder et al. | 210/662 |
| 4,548,716 | 10/1985 | Boeve | 210/669 |

Primary Examiner—Ivars Cintins
Attorney, Agent, or Firm—Millen & White

[57] ABSTRACT

A system for producing deionized water comprising at least a pair of oppositely charged ion exchanger units connected in series, a pump, a sensor for detecting the level of specific conductivity of process water and lines connecting the pump, ion exchanger unit and sensor in a closed-loop flow circuit. A controller operates the system in a first mode in which a batch of process water is repeatedly circulated along the closed-loop flow circuit until the specific conductivity sensed is less than a first predetermined level and alternately in a second mode in which the batch of water so treated is discharged while another batch of water is introduced into the system until the specific conductivity sensed is greater than a second predetermined level which is higher than the first predetermined level.

8 Claims, 3 Drawing Figures

WATER-DEIONIZING SYSTEM

BACKGROUND OF THE INVENTION

This invention relates to a system for producing highly deionized water.

A large quantity of deionized water is needed, for example, in the manufacture of various electronic devices such as semi-conductors for washing purposes. Prior systems for producing deionized water, especially those for producing highly deionized water are generally massive in structure and costly. Therefore, needs exist for producing a deionized water-producing system which is compact in structure and capable of producing deionized water in a reliable and stable fashion at a lower cost.

Purified water has been conventionally produced from suitable raw water using various water-purifying techniques such as distillation, adsorption, reverse osmosis, electrodialysis, ion-exchange and combinations of these techniques. The use of some form of ion-exchange techniques is imperative if highly deionized water is desired. Particularly, when producing highly deionized water having a specific conductivity of less than 0.1 $\mu$S/cm, it is imperative to use commercially available cartridges commonly referred to as water polisher containing a mixture of cationic and anionic ion-exchange materials. This is because these mixed bed cartridges may easily be cleansed free from mobile or unbound ions originating from activating (regenerating) agents before use, whereas cleansing of cationic and anionic ion-exchange materials placed in separate beds requires very large amounts of ultrapure water to remove mobile ions therefrom. However such mixed bed cartridges are practically incapable of regenerating their ion-exchange capacities and thus have to be disposed once their capacities have been exhausted. Since different regenerating agents are required for different ion-exchange materials, the mixture of different ion-exchange materials must be separated into its components before permitting the regeneration thereof. This separation can be done only incompletely and is not economical. It is for this reason that in prior systems mixed bed water polishers have been used in conjunction with massive pretreatment means in order to decrease loads to water polishers for extending their life.

SUMMARY OF THE INVENTION

I have discovered that when a batch of raw water is repeatedly circulated through at least a pair of series-connected reactors containing respectively a cation exchange resin activated or renegerated with HCl and an anion exchange resin activated or regenerated with NaOH, these resins may mutually bind mobile ions originating from each other's regenerating agent in a similar manner to cleansing mixed bed water polishers and the circulating water may be deionized to a specific conductivity close to the theoretically attainable limit of 0.05 $\mu$S/cm. Once the resins have been cleansed free from mobile ions in this way, they may be used for producing ultrapure water without using mixed bed water polishers while allowing their regeneration for repeated use. The present invention has its basis on this discovery.

Accordingly, the present invention provides a system for producing deionized water comprising:

at least a pair of a cation exchanger unit and an anion exchanger unit connected in series;

closed-loop flow path means for circulating a batch of water within the system through said ion exchanger units;

pumping means associated with said flow path means for repeatedly circulating said batch of water within the system in a predetermined direction;

sensor means for sensing the specific electric conductivity of water flowing through said flow path means at a location immediately downstream said ion exchanger units;

first valving means for selectively shutting off the flow of water through said flow path means at a location between said sensor means and said ion exchanger units;

inlet means merging with said flow path means at a location between said first valving means and said ion exchanger units for intermittently introducing raw water to the system;

outlet means branching from said flow path means at a location between said sensor means and said first valving means for intermittently discharging product water from the system;

second valving means associated with said outelt means; and control means responsive to the level of the specific conductivity sensed by said sensor means for controlling the operation of the system between (a) a first mode in which said batch of water is repeatedly circulated within the system with said first valving means open while said second valving means closed until said specific conductivity sensed by said sensor means is less than a first predetermined level, and (b) a second mode in which said batch of water is discharged from the system through said outlet means and simultaneously another batch of raw water is introduced into the system through said inlet means with said first valving means closed while said second valving means open until the specific conductivity sensed by said sensor means is greater than a second predetermined level which is higher than the first predetermined level.

Preferably the system comprises a plurality of pairs of said cationic ion exchanger unit and said anionic ion exchanger unit alternately connected in series.

Preferably the system may further comprises a carbon filter and a membrane filter to remove contaminants other than ionic impurities.

The system of the present invention may also be used for pretreating raw water which is ultimately treated with a mixed ion-exchanger bed, or the system itself may include a mixed ion-exchanger bed within its flow circuit.

DETAILED DESCRIPTION OF PREFERRED EMBODIMENTS

Figure 1:
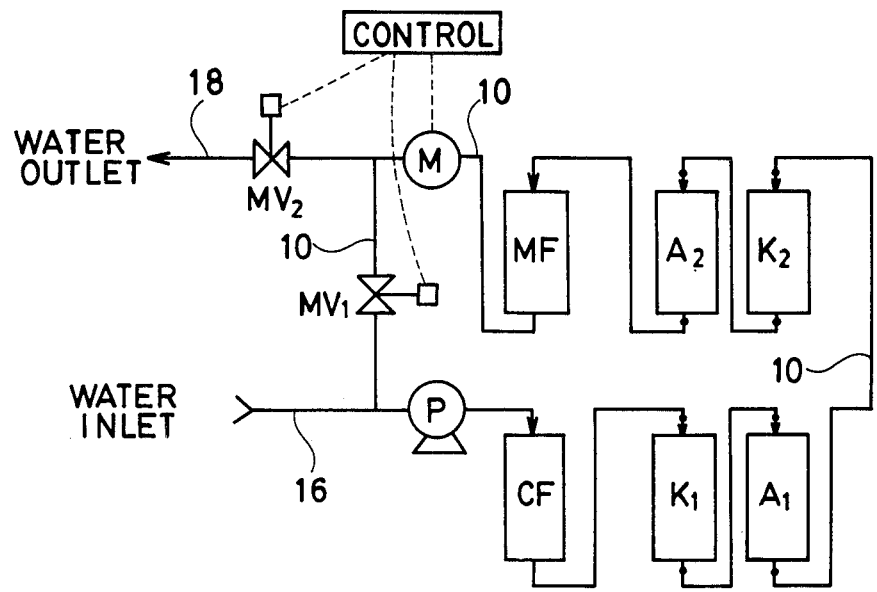
FIG. 1 is a schematic illustration of one embodiment of the system of the present invention.

Referring to FIG. 1, a water-deionizing system according to the first embodiment of the present invention is schematically illustrated. The system includes two pairs of a cation exchanger unit and an anion exchanger units $K_1$, $A_1$ and $K_2$, $A_2$ respectively. These units are connected in series so that the process water is passed through the cation exchanger unit and then the anion exchanger unit alternately or vice versa. It is preferable to use a plurality of such pairs of the ion exchanger units. This increases the efficiency of the system and also improves the quality of product water. Furthermore, a single ion exchanger unit may comprise a plurality of ion exchanger beds of the same charge.

The system includes a carbon filter CF upstream the first pair of ion exchanger units $K_1$, $A_1$ for adsorbing impurities such as organic contaminants, chlorine, iron rust and the like, and a membrane filter MF downstream the second pair of ion exchanger units $K_2$, $A_2$ for removing particulate matters.

Positioned upstream the carbon filter CF is a pump P. A sensor M is positioned downstream the membrane filter MF for sensing the specific conductivity of process water circulating within the system. A first magnetic valve $MV_1$ is provided between the sensor M and the pump P for selectively terminating the circulation of water in the system when product water is being discharged from the system during its second operational mode. Lines or conduits 10 connecting pump P, carbon filter CF, first pair of ion exchanger units $K_1$ and $A_1$, second pair of ion exchanger units $K_2$ and $A_2$, membrane filter MF, sensor M and magnetic valve $MV_1$ in a closed loop flow circuit are provided as shown.

A raw water inlet line 16 merges with the closed loop flow circuit at a location between the first magnetic valve $MV_1$ and the pump P.

A product water outlet line 18 is also provided branching from the closed loop flow circuit at a location between the sensor M and the first magnetic valve $MV_1$. A second magnetic valve $MV_2$ is provided in this outlet line 18.

A controller is provided to produce signals for selectively and alternately moving the first and second magnetic valves $MV_1$ and $MV_2$ between the open position and the closed position in response to the level of the specific conductivity sensed by the sensor M.

In other words, the controller causes the first valve $MV_1$ to close and the second valve $MV_2$ to open when the specific conductivity is less than a first predetermined level. When the conductivity is greater than a second predetermined level which is higher than the first predetermined level, the controller causes the first valve $MV_1$ to open and the second valve $MV_2$ to close.

In operation, a batch of raw water from suitable supply is introduced into the system via inlet line 16 with the magnetic valve $MV_1$ closed while the magnetic valve $MV_2$ open until the system is primed. The inlet line 16 may include a one-way valve (not shown) which is automatically closed when the liquid pressure in the system reaches at a predetermined level indicating that the system has been primed.

Sensor M now senses a specific electric conductivity greater than the second predetermined level and the controller causes the valve $MV_1$ to open and the valve $M_2$ to close. The system is now ready to operate in the first mode in which the pump P is actuated to circulate the batch of water in the system through carbon filter CF, pairs of ion exchanger units $K_1$, $A_1$ and $K_2$, $A_2$, and membrane filter MF repeatedly. Water is progressively deionized as it passes through pairs of ion exchanger units $K_1$, $A_1$ and $K_2$, $A_2$ repeatedly. Impurities such as organic contaminants, chlorine, iron rust and the like are adsorbed by carbon filter CF and particulate matters are filter off by filter MF.

When the specific conductivity of circulating water decreases less than a predetermined first level, for example less than 0.8 $\mu S/cm$, the controller cause the valve $MV_1$ to close and the valve $MV_2$ to open. The system is now ready to operate in the second mode in which the product water is discharged from the system through outlet line 18. At the same time, the one-way valve (not shown) associated with the raw water inlet line 16 is opened in response to the decrease in the liquid pressure in the system to charge the system with another batch of raw water. When the system has been charged with another batch of raw water, sensor M detects a specific conductivity greater than the second predetermined level, for example greater than 1.0 $\mu S/cm$, to switch the operation of this system to the first mode.

Thus, the system may produce batches of deionized water intermittently by repeating the above steps.

It is preferable for the system of the invention that all ion exchanger units take the form of replaceable cartridges. This greatly decreases non-operating time associated with the in-place regeneration of spent ion exchanger units, since exhausted units may be replaced with freshly regenerated units in a short time. The decrease in ion exchange capacity occurs first from the pair of ion exchanger units locating at the nearest place to the raw water line 16. Because of this, it is preferable to remove this pair for regeneration and then displace the remaining pair or pairs in counter flow manner successively. Then freshly regenerated pair of ion exchanger units may be placed at the remotest location from the inlet line 16. This enables to use each pair of ion exchanger units to the fullest extent.

Figure 2:
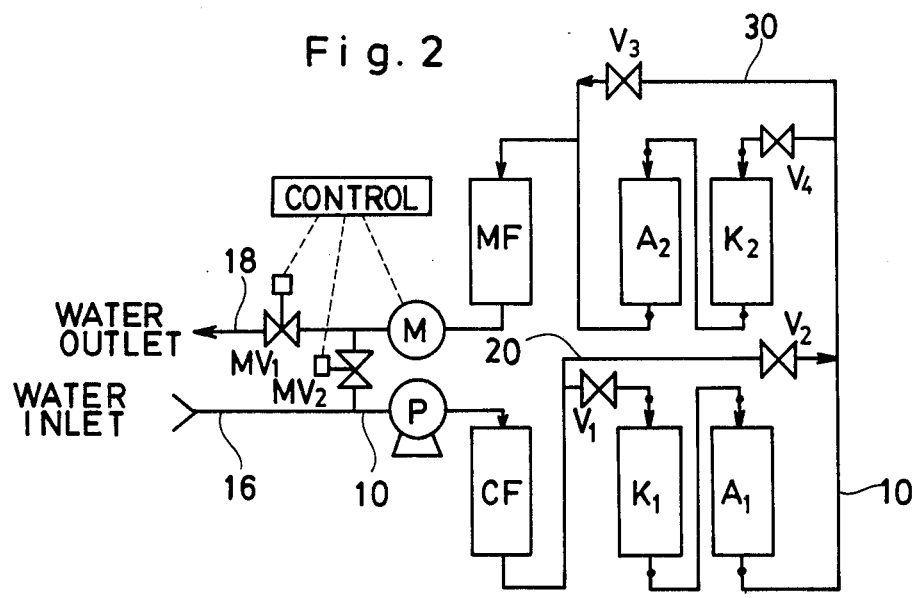
FIG. 2 is a similar view of another embodiment of the system.

Referring to FIG. 2, another embodiment of the system is illustrated. In this figure, the same reference numerals and legends identify the same elements as in FIG. 1 and the entire system operates in the same way as in FIG. 1 embodiment except as will be discussed below.

The system shown in FIG. 2 comprises by-pass lines 20 and 30 which by-pass the first pair of ion exchanger units $K_1$, $A_1$ and the second pair of ion exchanger units $K_2$, $A_2$ respectively. Manually operatable valves $V_1$ and $V_4$ are disposed in the main line 10 immediately upstream respective pairs of ion exchanger units $K_1$, $A_1$ and $K_2$, $A_2$ and similar valves $V_2$ and $V_3$ are provided in by-pass lines 20 and 30 respectively. Normally valves $V_2$ and $V_3$ are closed while valves $V_1$ and $V_4$ are open. When the replacement of the first pair of units $K_1$, $A_2$ is desired, one closes valve $V_4$ and opens valve $V_3$. Then units $K_2$, $A_3$ are replaced with freshly regenerated units $K_3$, $A_3$ (not shown). Then one may open valve $V_4$ and close valve $V_3$. Thereafter one opens valve $V_2$ and closes valve $V_1$ for replacing exhausted pair of units $K_1$, $A_1$ with units $K_2$, $A_2$.

The embodiment of FIG. 2 may eliminate non-operating time completely. This design also allows in-place regeneration of ion exchanger units as desired without terminating the circulation of water in the system.

Figure 3:
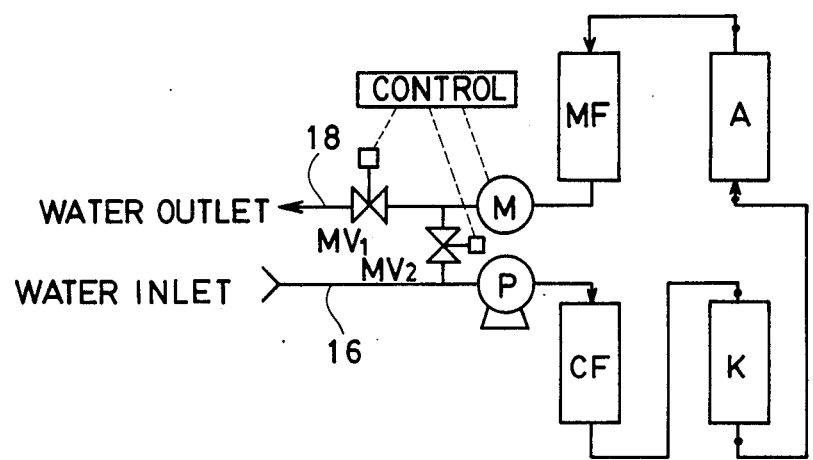
FIG. 3 is a similar view of a further embodiment of the system which is adapted for cleansing regenerated ion exchanger units before use.

In order to produce highly deionized water by the system as shown in FIG. 1 or FIG. 2, it is desirable that all of regenerated ion exchanger units be cleansed substantially free from mobile ions originating from their respective regenerating agents before installation to the system. FIG. 3 shows a system for cleansing the regenerated ion exchanger units for this purpose. The system shown in FIG. 3 is substantially the same as the system shown in FIG. 1 except that only a single pair of a cation exchanger unit and an anion exchanger unit is included in the system and that the circulating water passes through the anion exchanger unit upwardly. Since the upward flow may promote the free movement of ion exchanger particles within the unit housing more effectively, cleansing will be completed more rapidly than in reverse flow direction. In this case an anion exchanger unit A is to be cleansed and thus water passes through the unit A in upward direction while it passes in downward direction through a cation exchanger unit K connected to the unit A upstream thereof. When the specific conductivity of circulating water decreases less than the first predetermined level, unit A has been cleansed and becomes ready for use in the system shown in FIG. 1 or FIG. 2 for replacement of exhausted ion exchanger units. It is desirable to have at least two separate such systems each exclusively for use in cleansing a particular ion exchanger material. The system shown in FIG. 3 enables to provide an ion exchanger unit or cartridge having a high purity and a high ion-exchange capacity. It also eliminates or minimizes needs for ultrapure water for cleansing purposes.

Experiments have shown that a specific conductivity in the order of about 0.5 $\mu$S/cm may be attainable by the systems as shown. However, if still purer water having a specific conductivity in the order of or less than 0.1 $\mu$S/cm is desired, a conventional water polisher or a mixed bed ion exchanger cartridge may be interposed just upstream the membrane filter MF of the system shown in FIG. 1 or FIG. 2. Alternatively, the product water exiting outlet line 18 may be passed through a mixed bed ion exchanger cartridge. Such mixed bed cartridge may be prepared on site by filling a suitable housing with a mixture of different ion exchange resins regenerated and cleansed as hereinbefore discussed.

While particular embodiments of the invention have been shown and described, various modifications may be made without departing from the true spirit and scope of the invention which is defined in the appended claims.

I claim:

1. A system for producing deionized water comprising:

at least a pair of a cation exchanger unit and an anion exchanger unit connected in series;
closed-loop flow path means for circulating a batch of water within said system through said ion exchanger units;
pumping means associated with said flow path means for repeatedly circulating said batch of water within the system in a predetermined direction;
sensor means for sensing the specific conductivity of water flowing through said flow path means at a location immediately downstream said ion exchanger units;
first valving means for selectively shutting off the flow of water through said flow path means at a location between said sensor means and said ion exchanger units;
inlet means merging with said flow path means at a location between said first valving means and said ion exchanger units for intermittently introducing raw water to the system;
outlet means branching from said flow path means at a location between said sensor means and said first valving means for intermittently discharging product water from the system;
second valving means associated with said outlet means; and
control means responsive to the level of the specific conductivity sensed by said sensor means for controlling the operation of the system between (a) a first mode in which said batch of water is repeatedly circulated within the system with said first valving means open while said second valving means closed until said specific conductivity sensed by said sensor means is less than a first predetermined level, and (b) a second mode in which said batch of water is discharged from the system through said outlet means and simultaneously another batch of raw water is introduced into the system through said inlet means with said first valving means closed while said second valving means open until the specific conductivity sensed by said sensor means is greater than a second predetermined level which is higher than said first predetermined level.

2. The system according to claim 1 wherein said inlet means includes a one-way valve which is automatically closed when the system operates in said first mode.

3. The system according to claim 2 wherein said ion exchanger units all take the form of replaceable structures for regeneration.

4. The system according to claim 3 comprising a plurality of said pairs of ion exchanger units connected in series so that water passes through different ion exchanger beds alternately.

5. The system according to claim 4 further including by-pass flow means which by-pass each pair of said ion exchanger unit selectively.

6. The system according to claim 1 further including a carbon filter in said flow path means between said pumping means and said ion exchanger units.

7. The system according to claim 6 further including a membrane filter in said flow path means between said ion exchanger units and said sensor means.

8. The system according to claim 7 further including in said flow path means immediately upstream said membrane filter an ion exchanger unit comprising a mixture of oppositely charged ion exchanger materials.

* * * * *